United States Patent
Nishio et al.

(10) Patent No.: US 12,108,228 B2
(45) Date of Patent: Oct. 1, 2024

(54) VOICE PROCESSING SYSTEM AND VOICE PROCESSING METHOD

(71) Applicant: SHARP KABUSHIKI KAISHA, Osaka (JP)

(72) Inventors: Tatsuya Nishio, Osaka (JP); Maaki Shozu, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 368 days.

(21) Appl. No.: 17/672,198

(22) Filed: Feb. 15, 2022

(65) Prior Publication Data

US 2022/0295184 A1    Sep. 15, 2022

(30) Foreign Application Priority Data

Mar. 10, 2021   (JP) .................... 2021-038028

(51) Int. Cl.
| | |
|---|---|
| H04R 3/12 | (2006.01) |
| G06F 3/01 | (2006.01) |
| G06F 3/16 | (2006.01) |
| G10L 25/60 | (2013.01) |
| H04L 65/403 | (2022.01) |
| H04R 1/02 | (2006.01) |
| H04R 1/08 | (2006.01) |

(52) U.S. Cl.
CPC .............. *H04R 3/12* (2013.01); *G06F 3/016* (2013.01); *G06F 3/165* (2013.01); *G10L 25/60* (2013.01); *H04L 65/403* (2013.01); *H04R 1/026* (2013.01); *H04R 1/08* (2013.01); *H04R 2430/01* (2013.01)

(58) Field of Classification Search
CPC . H04R 3/12; H04R 1/026; H04R 1/08; H04R 2430/01; G06F 3/016; G06F 3/165; G10L 25/60; H04L 65/403
See application file for complete search history.

(56) References Cited

U.S. PATENT DOCUMENTS

| | | | | |
|---|---|---|---|---|
| 9,949,021 | B1* | 4/2018 | Voigt | H04R 29/002 |
| 9,953,650 | B1* | 4/2018 | Falevsky | G06F 3/013 |
| 11,095,853 | B1* | 8/2021 | Aher | H04N 7/15 |
| 2015/0179186 | A1* | 6/2015 | Swierk | G10L 25/60 |
| | | | | 704/276 |

(Continued)

FOREIGN PATENT DOCUMENTS

JP         2012217068 A  * 11/2012    ............ H04M 3/566

*Primary Examiner* — Fan S Tsang
*Assistant Examiner* — David Siegel
(74) *Attorney, Agent, or Firm* — ScienBiziP, P.C.

(57) ABSTRACT

A voice processing system includes: a plurality of microphone-speaker devices; a voice acquirer that acquires audio data from each of the microphone-speaker devices; a voice transmitter that transmits the audio data acquired by the voice acquirer to other microphone-speaker devices; a determination processor that determines whether or not a predetermined condition is met with respect to a factor that affects progress of a conference; a notification processor that causes, when the predetermined condition is met, a microphone-speaker device selected from among the plurality of microphone-speaker devices depending on the factor that affects the progress of the conference to provide specific information related to the predetermined condition.

14 Claims, 5 Drawing Sheets

(56) References Cited

U.S. PATENT DOCUMENTS

| | | | |
|---|---|---|---|
| 2015/0249736 A1* | 9/2015 | Johnston | H04M 1/6058 |
| | | | 455/418 |
| 2016/0255126 A1* | 9/2016 | Sarris | H04L 65/1096 |
| | | | 348/14.08 |
| 2017/0344535 A1* | 11/2017 | Shima | G06N 20/00 |

* cited by examiner

| CONFERENCE INFORMATION | | | | | |
|---|---|---|---|---|---|
| CONFERENCE ID | VENUE | STARTING DATE AND TIME | ENDING DATE AND TIME | PARTICIPANT | MATERIAL |
| M001 | R1,R2 | ts1 | te1 | A~H | F001 |
| ... | ... | ... | ... | ... | ... |

FIG. 5

| DEVICE ID | FACILITATOR | NOTIFICATION SOUND | VOLUME | MICROPHONE GAIN |
|---|---|---|---|---|
| MS001 | 1 | T1 | V1 | G1 |
| MS002 | 0 | 0 | V2 | G2 |
| MS003 | 0 | 0 | V3 | G3 |
| MS004 | 0 | 0 | V4 | G4 |
| MS005 | 0 | 0 | V5 | G5 |
| MS006 | 0 | 0 | V6 | G6 |
| MS007 | 0 | 0 | V7 | G7 |
| MS008 | 0 | 0 | V8 | G8 |

SETTING INFORMATION

VOICE PROCESSING SYSTEM AND VOICE PROCESSING METHOD

INCORPORATION BY REFERENCE

This application is based upon and claims the benefit of priority from the corresponding Japanese Patent Application No. 2021-038028 filed on Mar. 10, 2021, the entire contents of which are incorporated herein by reference.

BACKGROUND

The present disclosure relates to a voice processing system and a voice processing method for enabling transmission and reception of voice between microphone-speaker devices.

Conventional systems are known that allow a plurality of users in different locations (such as conference rooms) to conduct a conference (online conference) by respectively using terminals such as personal computers. For example, in a known remote conference system, a plurality of terminals are connected to one another, one of the plurality of terminals serves as a moderator terminal for a remote conference, and only the moderator terminal is permitted to control the floor of the other terminals participating in the remote conference.

Note here that in a case where a plurality of users participate in a conference in the same conference room, specific information (such as progress of the conference) desired to be provided only to, for example, a facilitator (user who facilitates and moderates the conference) is also provided to the other users in the same conference room. That is, providing the specific information also to the other users in the same conference room can, for example, disturb concentration of a user who is speaking or interrupt the speaking, causing discomfort to the user.

SUMMARY

It is an objective of the present disclosure to provide a voice processing system and a voice processing method that make it possible to provide specific information to a specific user without interfering with the progress of the conference.

A voice processing system according to an aspect of the present disclosure is a system for enabling transmission and reception of audio data representing voice spoken by a plurality of users between a plurality of wearable microphone-speaker devices that are respectively worn by the plurality of users, the voice processing system including: the plurality of microphone-speaker devices; a voice acquirer that acquires the audio data from each of the microphone-speaker devices; a voice transmitter that transmits the audio data acquired by the voice acquirer to other microphone-speaker devices; a determination processor that determines whether or not a predetermined condition is met with respect to a factor that affects progress of a conference; and a notification processor that causes, when the predetermined condition is met, a microphone-speaker device selected from among the plurality of microphone-speaker devices depending on the factor that affects the progress of the conference to provide specific information related to the predetermined condition.

A voice processing method according to another aspect of the present disclosure is a method for enabling transmission and reception of audio data representing voice spoken by a plurality of users between a plurality of wearable microphone-speaker devices that are respectively worn by the plurality of users, the voice processing method including implementation by one or more processors of: acquiring the audio data from each of the microphone-speaker devices; transmitting the audio data acquired in the acquiring to other microphone-speaker devices; determining whether or not a predetermined condition is met with respect to a factor that affects progress of a conference; and making a notification by causing, when the predetermined condition is met, a microphone-speaker device selected from among the plurality of microphone-speaker devices depending on the factor that affects the progress of the conference to provide specific information related to the predetermined condition.

According to the present disclosure, a voice processing system and a voice processing method can be provided that make it possible to provide specific information to a specific user without interfering with the progress of the conference.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings. Note that the embodiments described below each represent an example of an implementation of the present disclosure, and does not limit the technical scope of the present disclosure.

A voice processing system according to the present disclosure is applicable to cases where, for example, a plurality of users in two locations (for example, conference rooms R1 and R2) conduct a conference (for example, an online conference) using respective microphone-speaker devices. Each of the microphone-speaker devices has, for example, a neckband (neck-worn) shape, and the users respectively wear the microphone-speaker devices around the users' necks to participate in the conference. Each user can hear voice outputted from a speaker of the user's microphone-speaker device and can have the user's voice collected by a microphone of the microphone-speaker device. The voice processing system according to the present disclosure is also applicable to cases where a plurality of users in a single location conduct a conference using respective microphone-speaker devices.

Conference System 100

Figure 1:
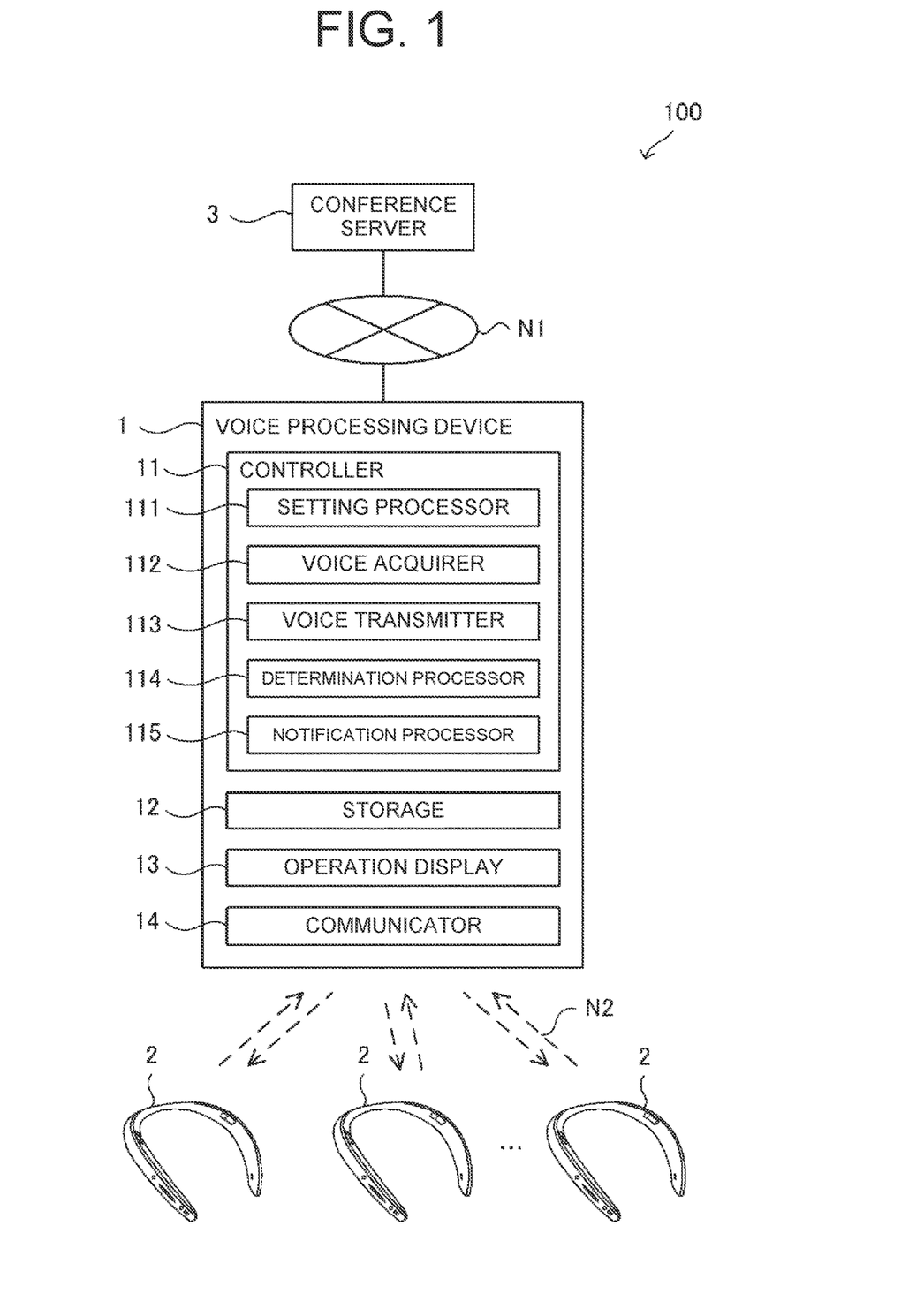
FIG. 1 is a diagram illustrating a configuration of a conference system according to an embodiment of the present disclosure.

FIG. 1 is a diagram illustrating a configuration of a conference system according to an embodiment of the present disclosure. The conference system 100 includes a voice processing device 1, a plurality of microphone-speaker devices 2, and a conference server 3. The microphone-speaker devices 2 are each acoustic equipment having a microphone 24 and a speaker 25. The microphone-speaker devices 2 may have, for example, an AI speaker function and a smart speaker function. The microphone-speaker devices 2 are wearable microphone-speaker devices and are respectively worn by the plurality of users. The conference system 100 enables transmission and reception of audio data representing voice spoken by the users between the microphone-speaker devices 2. The conference system 100 is an example of a voice processing system according to the present disclosure.

The conference server 3 executes a conference application for implementing the online conference. The conference server 3 also manages conference information. The voice processing device 1 controls each of the microphone-speaker devices 2, and performs a process for enabling the transmission and reception of voice between the microphone-speaker devices 2 once the conference has started. Note that the voice processing device 1 alone may constitute the voice processing system according to the present disclosure.

The present embodiment will be described using an online conference shown in FIG. 2 as an example. Of users A to H who are participants in the online conference, the users A, B, C, and D are located in the conference room R1, and the users E, F, G, and H are located in the conference room R2. The users A to H respectively wear microphone-speaker devices 2A to 2H around their necks to participate in the conference. The conference room R1 has a voice processing device 1a and a display DP1. The conference room R2 has a voice processing device 1b and a display DP2. The displays DP1 and DP2 share each other's screens, and display, for example, conference materials. The voice processing device 1a and the display DP1, and the voice processing device 1b and the display DP2 are configured to perform data communication via a communication network N1 (for example, the Internet). The voice processing devices 1a and 1b are information processing devices (for example, personal computers) having the same functions. The voice processing devices 1a and 1b will be referred to as a "voice processing device 1" when common features thereof are described.

Specifically, the conference server 3 transmits and receives audio data from and to the conference rooms R1 and R2 through the microphone-speaker devices 2 and the voice processing devices 1a and 1b using the communication network N1 of the Internet. For example, the voice processing device 1a acquires data of voice spoken by the user A from the microphone-speaker device 2A, and then transmits the thus obtained audio data to the conference server 3. The conference server 3 transmits the audio data acquired from the voice processing device 1a to the voice processing devices 1a and 1b. The voice processing device 1a transmits the audio data acquired from the conference server 3 to each of the microphone-speaker devices 2B to 2D of the users B to D, so that the spoken voice is outputted (emitted) therefrom. Likewise, the voice processing device 1b transmits the audio data acquired from the conference server 3 to each of the microphone-speaker devices 2E to 2H of the users E to H, so that the spoken voice is outputted (emitted) therefrom. The conference server 3 also causes the displays DP1 and DP2 to display information such as conference materials upon receiving a user's operation. As described above, the conference server 3 implements the online conference.

Figure 4:
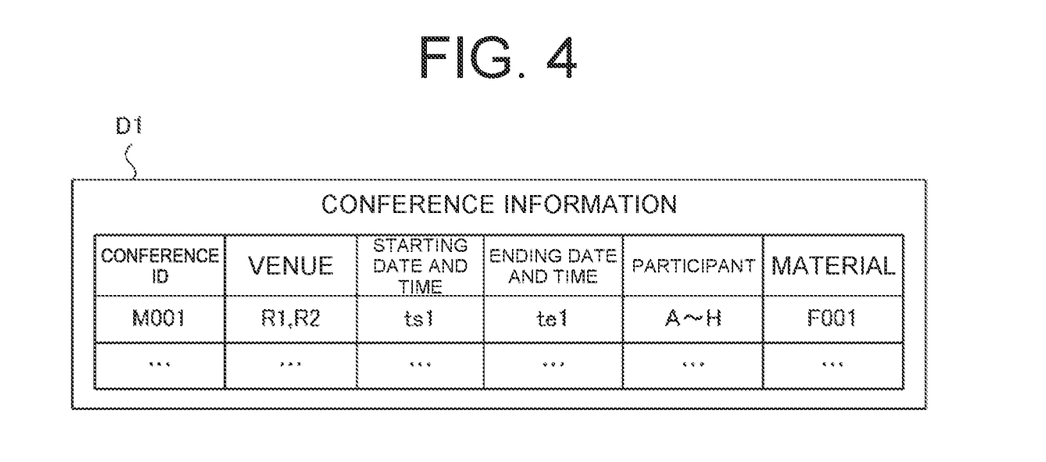
FIG. 4 is a diagram showing an example of conference information that is used in the conference system according to the embodiment of the present disclosure.

The conference server 3 also stores data such as conference information D1 related to online conferences. FIG. 4 shows an example of the conference information D1. As shown in FIG. 4, the conference information D1 includes the following information on a per-conference basis: conference identification information (conference ID), conference venue, conference starting date and time, conference ending date and time, conference participant, and conference material to be used. Information about the online conference shown in FIG. 2 is registered under the conference ID "M001". For example, a host of the online conference uses his or her own terminal (personal computer) to register the conference information D1 in advance. The conference server 3 may be a cloud server.

Microphone-Speaker Device 2

Figure 3:
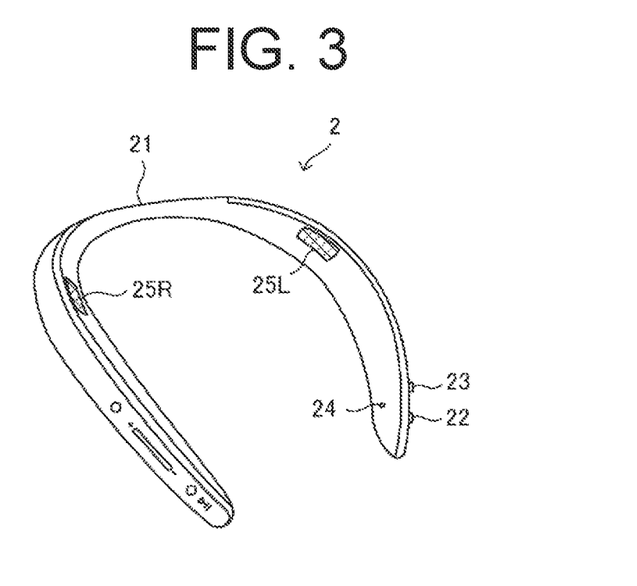
FIG. 3 is an external view of a configuration of a microphone-speaker device according to the embodiment of the present disclosure.

FIG. 3 is a diagram showing an example of an external view of the microphone-speaker devices 2. As illustrated in FIG. 3, each of the microphone-speaker device 2 includes a power supply 22, a connection button 23, the microphone 24, the speaker 25, and a communicator (not shown). The microphone-speaker device 2 is, for example, a neckband-type wearable device that can be worn around the user's neck. The microphone-speaker device 2 acquires the user's voice through the microphone 24 and outputs voice to the user from the speaker 25. The microphone-speaker device 2 may have a display for displaying various types of information.

As illustrated in FIG. 3, a main body 21 of the microphone-speaker device 2 is in a U-shape, and has left and right arms as seen from the user wearing the microphone-speaker device 2.

The microphone 24 is disposed at an end of the microphone-speaker device 2 so as to easily collect voice spoken by the user. The microphone 24 is connected to a microphone substrate (not shown) disposed inside the microphone-speaker device 2.

The speaker 25 includes a speaker 25L disposed in the left arm and a speaker 25R disposed in the right arm, as seen by the user wearing the microphone-speaker device 2. The speakers 25L and 25R are each disposed near the center of the corresponding arm of the microphone-speaker device 2 so that the user can easily hear sound outputted therefrom. The speakers 25L and 25R are connected to a speaker substrate (not shown) disposed inside the microphone-speaker device 2.

The microphone substrate is a transmitter substrate for transmitting audio data to the voice processing device 1 and is included in the communicator. The speaker substrate is a receiver substrate for receiving audio data from the voice processing device 1 and is included in the communicator.

The communicator is a communication interface for executing wireless data communication in accordance with a predetermined communication protocol between the microphone-speaker device 2 and the voice processing device 1. Specifically, the communicator executes the communication by connecting the microphone-speaker device 2 to the voice processing device 1 by, for example, a Bluetooth method. When the user presses the connection button 23 after turning on the power supply 22, for example, the communicator executes a pairing process to connect the microphone-speaker device 2 to the voice processing device 1. Note that a transmitter may be disposed between the microphone-speaker device 2 and the voice processing device 1. In this case, the transmitter may be paired with the microphone-speaker device 2 (Bluetooth connection), and the transmitter and the voice processing device 1 may be connected to each other via the Internet.

Voice Processing Device 1

As illustrated in FIG. 1, the voice processing device 1 is a server including, for example, a controller 11, a storage 12, an operation display 13, and a communicator 14. Note that the voice processing device 1 is not limited to being a single computer, but may be a computer system in which a plurality of computers operate in cooperation with each other. Furthermore, various processes that are executed by the voice processing device 1 may be performed by one processor or may be performed decentrally by a plurality of processors.

The communicator 14 connects the voice processing device 1 to a communication network N2 in a wired or wireless manner to execute data communication in accordance with a predetermined communication protocol with external devices such as the microphone-speaker devices 2 and the displays DP1 and DP2 via the communication network N2. For example, the communicator 14 connects to the microphone-speaker devices 2 by executing a pairing process by the Bluetooth method. The communicator 14 also connects to the communication network N1 (for example, the Internet) to execute data communication between a plurality of locations (conference rooms R1 and R2) when an online conference is conducted.

The operation display 13 is a user interface including a display such as a liquid-crystal display or an organic electroluminescence (EL) display that displays various types of information, and an operator such as a mouse, a keyboard, or a touch panel that receives operations.

The storage 12 is a non-volatile storage such as a hard disk drive (HDD) or a solid state drive (SSD) that stores various types of information. Specifically, data such as setting information D2 of the microphone-speaker devices 2 is stored in the storage 12.

Figure 5:
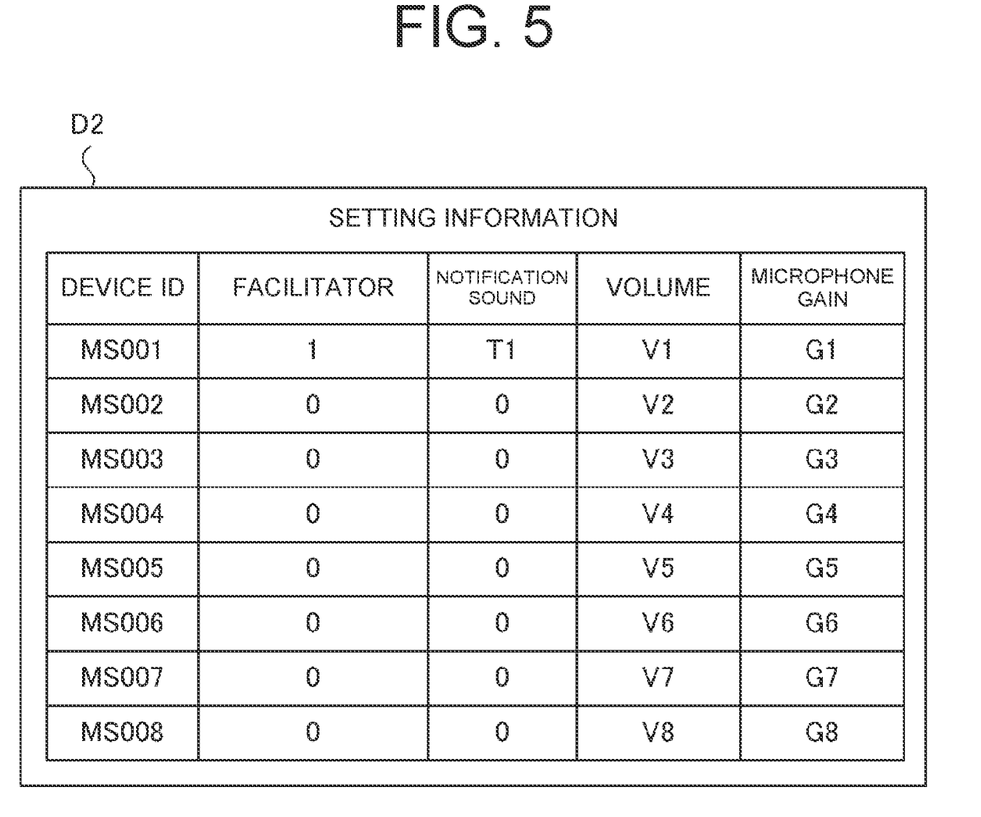
FIG. 5 is a diagram showing an example of setting information that is used in the conference system according to the embodiment of the present disclosure.

FIG. 5 shows an example of the setting information D2. As shown in FIG. 5, the setting information D2 includes information such as "device ID", "facilitator", "notification sound", "volume", and "microphone gain". The "device ID" is identification information of each microphone-speaker device 2. For example, a device number is registered as the device ID. In this example, "MS001" to "MS008" respectively correspond to the microphone-speaker devices 2A to 2H. The "facilitator" is information that indicates whether or not the user is a facilitator of the online conference (user who facilitates and moderates the conference). The example shown in FIG. 5 indicates that the user A who uses the microphone-speaker device 2A corresponding to "MS001" is a facilitator. The "notification sound" is information such as the volume and the type of a notification sound to be outputted from the facilitator's microphone-speaker device 2. The "volume" is information of the volume of each microphone-speaker device 2, and the "microphone gain" is information of the microphone gain of each microphone-speaker device 2.

The users can, for example, select and register the facilitator, select and register the notification sound, and adjust the volume and the microphone gain by operating (touching) a setting screen (not shown) displayed on the displays DP1 and DP2. The controller 11 stores the setting information D2 in response to the users' operations.

The storage 12 also stores therein a control program such as a conference facilitation program for causing the controller 11 to execute a conference facilitation process (see FIG. 6) described below. For example, the conference facilitation program may be recorded in a non-transitory manner on a computer-readable recording medium such as a compact disk (CD) or a digital versatile disk (DVD), read by a reading device (not shown) such as a CD drive or a DVD drive included in the voice processing device 1, and then stored in the storage 12.

The controller 11 includes control devices such as a computer processing unit (CPU), read-only memory (ROM), and random access memory (RAM). The CPU is a processor that performs various arithmetic operations. The ROM is a non-volatile storage in which control programs such as Basic Input/Output System (BIOS) and an operating system (OS) are prestored for causing the CPU to execute various arithmetic operations. The RAM is a volatile or non-volatile storage in which various types of information are stored, and is used as transitory storage memory (working area) for the various processes that are executed by the CPU. The controller 11 controls the voice processing device 1 through the CPU executing the various control programs prestored in the ROM or the storage 12.

In a case where a plurality of users participate in a conference in the same conference room according to a conventional technique, specific information (such as progress of the conference) desired to be provided only to, for example, a facilitator (user who facilitates and moderates the conference) is also provided to the other users in the same conference room. That is, providing the specific information also to the other users in the same conference room can, for example, disturb concentration of a user who is speaking or interrupt the speaking, causing discomfort to the user. By contrast, the voice processing device 1 according to the present embodiment makes it possible to provide specific information to a specific user without interfering with the progress of the conference.

Specifically, as illustrated in FIG. 1, the controller 11 includes various processors such as a setting processor 111, a voice acquirer 112, a voice transmitter 113, a determination processor 114, and a notification processor 115. Note that the controller 11 functions as the various processors through the CPU executing the various processes in accordance with the control programs. Moreover, some or all of the processors may be configured by an electronic circuit. Note that the control programs may be those that cause a plurality of processors to function as the various processors.

The setting processor 111 performs setting related to the microphone-speaker devices 2. Specifically, upon each microphone-speaker device 2 being connected to (paired with) the voice processing device 1, the setting processor 111 acquires the identification information (for example, the device number) of the microphone-speaker device 2 and registers the identification information as the "device ID" in the setting information D2. Furthermore, upon acquiring information on the facilitator, the notification sound, the volume, and the microphone gain through each user's operation, the setting processor 111 resisters the information as the "facilitator", the "notification sound", the "volume", and the "microphone gain" in the setting information D2. That is, when a conference in which the plurality of users are participating is conducted, the setting processor 111 sets the microphone-speaker device 2 of a user who serves as the facilitator among the plurality of users.

When a user speaks, the microphone 24 of the user's microphone-speaker device 2 collects spoken voice, and the voice acquirer 112 acquires audio data representing the spoken voice from the microphone-speaker device 2. For example, when the user A who serves as the facilitator speaks after the online conference has started, the microphone 24 of the microphone-speaker device 2A collects voice spoken by the user A, and the microphone-speaker device 2A transmits audio data representing the spoken voice to the voice processing device 1. The voice acquirer 112 acquires the audio data representing the voice spoken by the user A from the microphone-speaker device 2A. The voice acquirer 112 acquires audio data from each of the microphone-speaker devices 2A. The voice acquirer 112 is an example of a voice acquirer according to the present disclosure.

The voice transmitter 113 transmits the audio data acquired by the voice acquirer 112 to each of the microphone-speaker devices 2. For example, upon the voice acquirer 112 acquiring audio data representing voice spoken by the user A who serves as the facilitator from the microphone-speaker device 2A, the voice transmitter 113 transmits the audio data to the microphone-speaker devices 2B to 2H other than the microphone-speaker device 2A. Note that the audio data is transmitted to the microphone-speaker devices 2 via the conference server 3.

The voice transmitter 113 may transmit the audio data only to the microphone-speaker devices 2 in a conference room other than the conference room having the voice processing device 1 transmitting the audio data. For example, in a case where the voice acquirer 112 has acquired audio data representing voice spoken by the user A located in the conference room R1 from the microphone-speaker device 2A, the voice transmitter 113 may transmit the audio data only to the microphone-speaker devices 2E to 2H in the conference room R2 via the conference server 3. The users B to D in the same conference room R1 as the user A can directly hear the voice spoken by the user A without using the microphone-speaker devices 2B to 2D. The voice transmitter 113 is an example of a voice transmitter according to the present disclosure.

The determination processor 114 determines whether or not a predetermined condition for causing a microphone-speaker device 2 to provide specific information (announcement) is met. Specifically, the determination processor 114 determines whether or not a predetermined condition is met with respect to a factor that affects the progress of the conference. The factor includes at least one of the following: the progress of the conference in which the plurality of users are participating, a communication state of the transmission and reception of the audio data, and a speaking state of each user. For example, the determination processor 114 determines whether or not a predetermined condition is met with respect to at least one of the following: the progress of the conference in which the plurality of users are participating, the communication state of the transmission and reception of the audio data, and the speaking state of each user. For example, the determination processor 114 determines whether or not a predetermined period of time (for example, one hour) has elapsed since the start of the conference. For another example, the determination processor 114 determines whether or not the current time is a clock time a predetermined period time (15 minutes) earlier than the ending time of the conference, that is, whether or not the remaining time until the ending time of the conference is less than or equal to the predetermined period of time. The predetermined condition is not limited to the examples given above. Other examples of the predetermined condition will be described below. The determination processor 114 is an example of a determination processor according to the present disclosure.

When the predetermined condition is met, the notification processor 115 causes a specific microphone-speaker device 2 to provide specific information related to the predetermined condition (announcement). Specifically, when the predetermined condition is met, the notification processor 115 causes a microphone-speaker device 2 selected from among the plurality of microphone-speaker devices 2 depending on the factor that affects the progress of the conference to provide specific information related to the predetermined condition to the user of the selected microphone-speaker device 2.

For example, when the predetermined condition is met, the notification processor 115 causes the specific microphone-speaker device 2 to output a predetermined notification sound. For example, when the predetermined period of time (for example, one hour) has elapsed since the start of the conference, or when the current time is a clock time the predetermined period time (15 minutes) earlier than the ending time of the conference, the notification processor 115 transmits audio data representing the notification sound registered in the setting information D2 to the microphone-speaker device 2A of the facilitator (user A) to cause the microphone-speaker device 2A to output the notification sound. The notification processor 115 may, for example, output a buzzer sound (chime sound) or a notification voice telling that one hour has elapsed since the start of the conference or the remaining time until the end of the conference is 15 minutes. The notification sound is an example of specific information according to the present disclosure. The facilitator (user A) is an example of a first user according to the present disclosure. In the example given above, the controller 11 selects, as the microphone-speaker device 2 to output the notification sound, the microphone-speaker device 2A of the facilitator, who facilitates and moderates the conference, and thus has an influence on the progress of the conference.

The notification processor 115 may cause the specific microphone-speaker device 2 to output the notification sound at a volume lower than a volume at which the microphone-speaker device 2 outputs voice spoken by the users. This configuration makes it possible to prevent the notification sound from being heard by other users.

According to the configuration described above, the speakers 25L and 25R of the microphone-speaker device 2A are disposed near the ears of the user A, so that the notification sound can be heard only by the user A without being heard by other users. This configuration allows the user A to know the progress of the conference (for example, the elapsed time or the remaining time), without other users noticing. Furthermore, other users do not have their concentration on the conference agenda disturbed by the notification sound. Thus, it is possible to improve the efficiency of the conference.

In a configuration in which each microphone-speaker device 2 has a display, the notification processor 115 may cause the display to display text information corresponding to the notification voice.

Conference Facilitation Process

Figure 6:
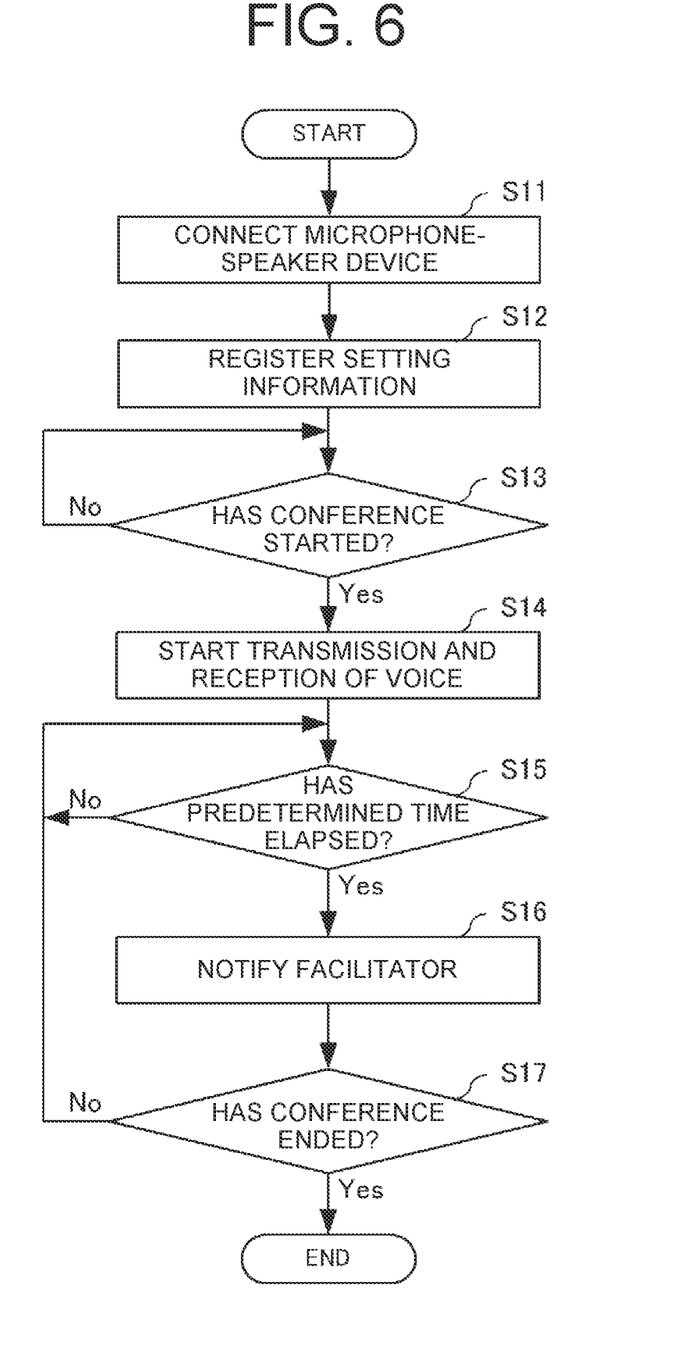
FIG. 6 is a flowchart for explaining an example of procedures of a conference facilitation process to be executed in the conference system according to the embodiment of the present disclosure.

With reference to FIG. 6, the following describes an example of procedures of the conference facilitation process to be executed by the controller 11 of the voice processing device 1. Note that the present disclosure can be regarded as a disclosure of a conference facilitation method (voice processing method according to the present disclosure) in which one or more steps included in the conference facilitation process are performed. One or more steps included in the conference facilitation process described herein may be omitted as appropriate. Furthermore, the order in which the steps in the conference facilitation process are performed may be changed as long as the same or similar effects are produced. In the example described below, the controller 11 performs all of the steps in the conference facilitation process. However, according to another embodiment, one processor may perform the steps in the conference facilitation process or a plurality of processors may decentrally perform the steps in the conference facilitation process.

Figure 2:
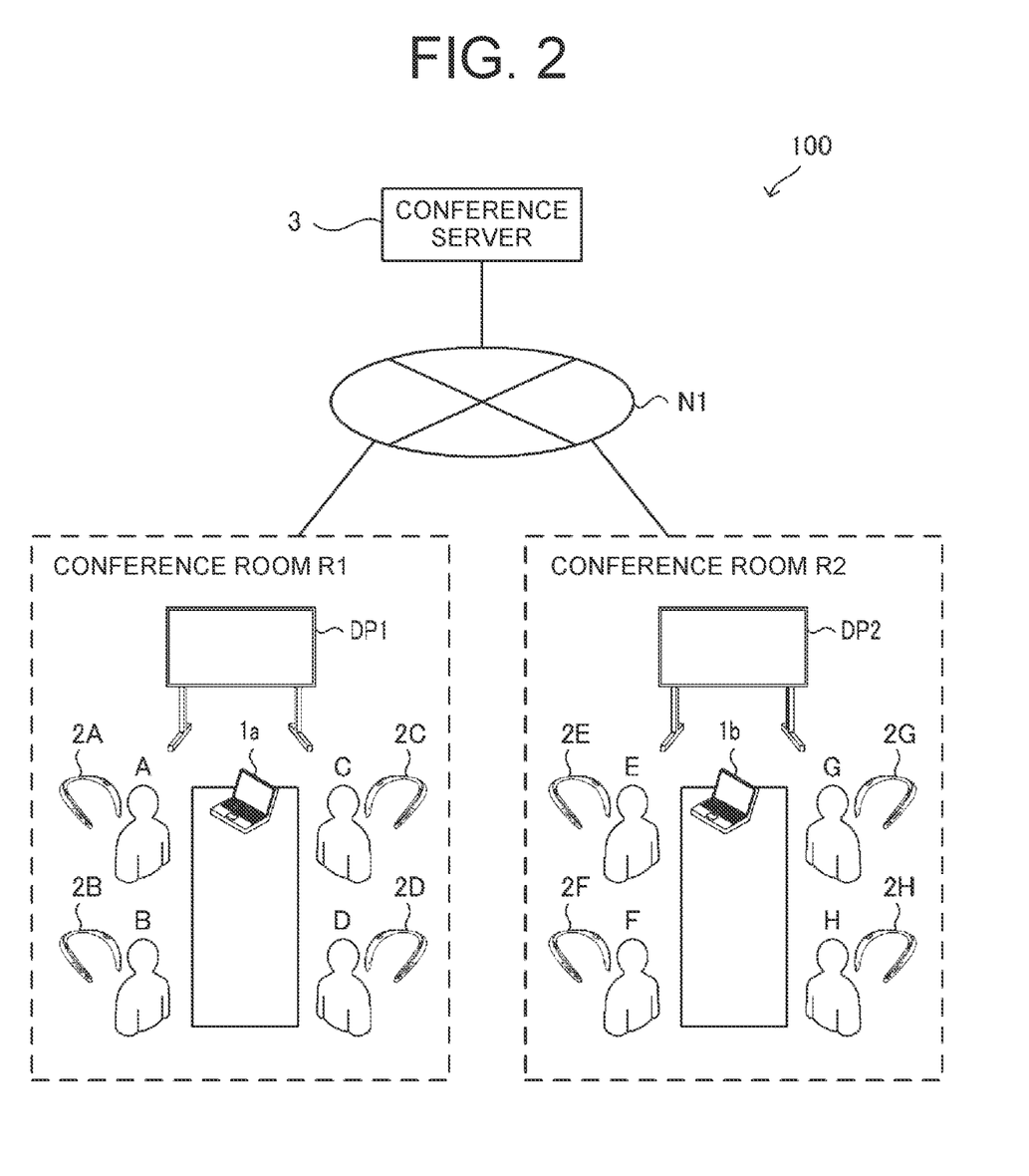
FIG. 2 is a diagram illustrating an application example of the conference system according to the embodiment of the present disclosure.

The following describes the conference facilitation process using the online conference shown in FIG. 2 as an example. The controller 11 starts the conference facilitation process upon the power supply 22 of each microphone-speaker device 2 being turned on.

First, in Step S11, the controller 11 connects each of the microphone-speaker devices 2 to the voice processing device 1. For example, upon each user who is participating in the conference pressing the connection button 23 of the user's microphone-speaker device 2, the controller 11 executes a pairing process with the microphone-speaker device 2 by the Bluetooth method to establish a connection between the microphone-speaker devices 2 and the voice processing device 1.

Next, in Step S12, the controller 11 registers the setting information D2 (see FIG. 4). Specifically, the controller 11 acquires the identification information (for example, the device number) of each microphone-speaker device 2 and registers the identification information as the "device ID" in the setting information D2. Furthermore, upon acquiring information on the facilitator, the notification sound, the volume, and the microphone gain through each user's operation, the controller 11 resisters the information as the "facilitator", the "notification sound", the "volume", and the "microphone gain" in the setting information D2. In this example, the setting information D2 corresponding to the microphone-speaker devices 2A to 2H worn by the users A to H participating in the online conference is stored in the storage 12. Furthermore, upon the user A being appointed as the facilitator of the online conference, identification information "1" for the "facilitator" is registered for the device ID "MS001" of the microphone-speaker device 2A of the user A.

Next, in Step S13, the controller 11 determines whether or not the conference has started. If the conference has started (S13: Yes), the process advances to Step S14. The controller 11 waits until the conference has started (S13: No). The online conference starts, for example, when the user A performs a starting operation for the online conference. The controller 11 starts measuring time (conference time) when the online conference starts.

In Step S14, the controller 11 acquires audio data representing voice spoken by each user from the user's microphone-speaker device 2, and then starts a process for transmitting the audio data to the microphone-speaker devices 2 of other users. For example, upon acquiring audio data representing voice spoken by the user A who serves as the facilitator from the microphone-speaker device 2A, the controller 11 starts the process for transmitting the audio data to each of the microphone-speaker devices 2B to al of the users B to H. Note that the audio data is transmitted to the microphone-speaker devices 2E to 2H of the users E to H in the conference room R2 via the conference server 3. Step S14 is an example of acquiring and transmitting according to the present disclosure.

Next, in Step S15, the controller 11 determines whether or not the conference time (measured time) has reached a predetermined period of time. For example, the controller 11 determines whether or not one hour has elapsed since the start of the conference. If the conference time has reached the predetermined period of time (S15: Yes), the process advances to Step S16. The controller 11 continues this determination process (S15: No) until the conference time has reached the predetermined period of time. Step S15 is an example of determining according to the present disclosure.

According to another embodiment, the controller 11 may determine whether or not the remaining time until the ending time of the conference is less than or equal to a predetermined period of time.

In Step S16, the controller 11 causes a specific microphone-speaker device 2 to output a predetermined notification sound. For example, when the predetermined period of time (for example, one hour) has elapsed since the start of the conference, or when the remaining time until the ending time of the conference is less than or equal to the predetermined period of time (15 minutes), the controller 11 transmits audio data representing the notification sound registered in the setting information D2 to the microphone-speaker device 2A of the facilitator (user A) to cause the microphone-speaker device 2A to output the notification sound. The controller 11 may cause the microphone-speaker device 2A to output a predetermined buzzer sound (chime sound) or a predetermined notification voice (for example, a voice telling that one hour has elapsed since the start of the conference or the remaining time until the end of the conference is 15 minutes). Step S16 is an example of making a notification according to the present disclosure.

Next, in Step S17, the controller 11 determines whether or not the conference has ended. The online conference ends, for example, when the user A performs an ending operation for the online conference. The controller 11 ends the conference facilitation process when the online conference has ended (S17: Yes). If the online conference has not ended (S17: No), the process returns to Step S15.

Upon the process returning to Step S15, the controller 11 determines, for example, whether or not two hours have elapsed since the start of the conference, or whether or not the remaining time until the end of the conference is less than or equal to five minutes. If two hours have elapsed since the start of the conference or the remaining time is less than or equal to five minutes (S15: Yes), then in Step S16, the controller 11 retransmits audio data representing the notification sound to the microphone-speaker device 2A of the user A to cause the microphone-speaker device 2A to output the notification sound. The volume or the type of the notification sound to be employed by the controller 11 for the second time may be different from that of the notification sound employed for the first time. For example, the controller 11 may increase the volume of the notification sound as the number of repetitions of the notification sound increases.

As described above, the conference system 100 includes a plurality of wearable microphone-speaker devices 2 that are respectively worn by a plurality of users, and enables transmission and reception of audio data representing voice spoken by the users between the microphone-speaker devices 2. The conference system 100 acquires the audio data from each of the microphone-speaker devices 2 and transmits the acquired audio data to other microphone-speaker devices 2. Furthermore, the conference system 100 determines whether or not a predetermined condition is met with respect to at least one of the following: the progress of the conference in which the plurality of users are participating, the communication state of the transmission and reception of the audio data, and the speaking state of each user. When the predetermined condition is met, the conference system 100 causes a specific microphone-speaker device 2 to provide specific information related to the predetermined condition.

This configuration makes it possible to provide the specific information only to the user of the specific microphone-speaker device 2. For example, it is possible of, for example, the progress of the conference, the communication state, and the speaking state only to the user who serves as the facilitator without the participants in the conference noticing. That is, it is possible to provide specific information to a specific user without interfering with the progress of the conference. Thus, the conference can be conducted efficiently.

The present disclosure is not limited to the embodiments described above. The following describes other embodiments of the present disclosure.

According to the foregoing embodiment, the notification processor 115 causes the specific microphone-speaker device 2 (microphone-speaker device 2 of the facilitator) to output the notification sound when the predetermined period of time (for example, one hour) has elapsed since the start of the conference, or when the remaining time until the ending time of the conference is less than or equal to the predetermined period of time (15 minutes). According to another embodiment, the predetermined condition may be related to communication quality of the online conference such as an error state, a communication bandwidth state, a communication speed state, and a noise state of the online conference. Specifically, the determination processor 114 determines whether or not the communication quality of each user's audio data is lower than or equal to a predetermined level in an online conference in which the plurality of users are remotely participating. For example, the determination processor 114 determines whether or not the communication bandwidth of the Internet communication (communication network N1), which enables the transmission and reception of audio data between the conference rooms R1 and R2, is narrower than or equal to a predetermined bandwidth. This communication bandwidth refers to, for example, the bandwidth of the communication between the conference server 3 and the voice processing device 1. The notification processor 115 causes the specific microphone-speaker device 2 (microphone-speaker device 2 of the facilitator) to output the notification sound when the communication bandwidth is narrower than or equal to the predetermined bandwidth. This configuration allows the user who serves as the facilitator to know the fact that the communication quality has decreased, so that the facilitator can quickly take action to improve the communication quality without other users noticing. The notification processor 115 may, for example, cause the specific microphone-speaker device 2 to output a notification voice telling that the communication bandwidth has narrowed. In the example given above, the controller 11 selects a microphone-speaker device 2 connected to the voice processing device 1a when the bandwidth of the communication between the conference server 3 and the voice processing device 1a is narrower than or equal to the predetermined bandwidth, because the bandwidth of the communication between the conference server 3 and the voice processing device 1a affects the progress of the conference.

For another example, the notification processor 115 causes the specific microphone-speaker device 2 to output the notification sound when an error has been detected in the transmission of audio data. For another example, the notification processor 115 causes the specific microphone-speaker device 2 to output the notification sound when the communication speed of audio data is lower than or equal to a predetermined speed. For another example, the notification processor 115 causes the specific microphone-speaker device 2 to output the notification sound when a noise component of audio data is greater than or equal to a predetermined level.

According to another embodiment, the predetermined condition may be related to a microphone input time of each microphone-speaker device 2, which is a time of input to the microphone thereof. For example, the determination processor 114 determines whether or not a continuous input time of spoken voice inputted to the microphone 24 of each microphone-speaker device 2 is longer than or equal to a predetermined period of time. When the continuous input time of any of the microphone-speaker devices 2 is longer than or equal to the predetermined period of time, the notification processor 115 causes the microphone-speaker device 2 to output the notification sound. For example, when the user E continues to speak for the predetermined period of time (10 minutes) or longer, the notification processor 115 causes the microphone-speaker device 2E of the user E to output the notification sound. In the example given above, the controller 11 selects the microphone-speaker device 2E of the user E as the microphone-speaker device 2 to output the notification sound, because the speaking of the user E affects the progress of the conference. This configuration allows the user E to be aware, without other users noticing, that the user E has been speaking for a long time. Note that the predetermined period of time may be set depending on each user's attribute. For example, the predetermined period of time is set to a longer period of time (15 minutes) for the user A who serves as the facilitator in charge of explaining the agenda, and the predetermined period of time is set to a shorter period of time (5 minutes) for the other users B to H who ask questions, for example. This configuration allows for lively and efficient discussions.

According to another embodiment, the notification processor 115 may cause at least one of the speakers 25L and 25R of a specific microphone-speaker device 2 to output the notification sound depending on an importance level of the content of the notification. For example, the controller 11: sets the importance level to "high" for the notification sound indicating that the communication quality of the online conference has decreased and for the notification sound indicating that the remaining time until the end of the conference is less than or equal to five minutes; sets the importance level to "medium" for the notification sound indicating that the remaining time until the end of the conference is less than or equal to 15 minutes and for the notification sound indicating that the microphone input time is longer than or equal to the predetermined period of time; and sets the importance level to "low" for the notification sound indicating that one hour has elapsed since the start of the conference and for the notification sound indicating that the background noise is greater than or equal to the predetermined level. For example, the notification processor 115 causes both of the speakers 25L and 25R to output the notification sound when the condition for the "high" importance level is met, causes only the speaker 25L to output the notification sound when the condition for the "medium" importance level is met, and causes only the speaker 25R to output the notification sound when the condition for the "low" importance level is met. This configuration allows a desired user to be aware of the importance level of the content of the notification.

As described above, the notification processor 115 may cause a specific microphone-speaker device 2 to provide specific information corresponding to the importance level of the predetermined condition. That is, the notification processor 115 causes both of the speakers 25L and 25R of the specific microphone-speaker device 2 to output the notification sound when the importance level of the predetermined condition is a first importance level, and causes one of the speakers 25L and 25R to output the notification sound when the importance level of the predetermined condition is a second importance level, which is lower than the first importance level.

According to another embodiment, the notification processor 115 may make a notification to a specific user by causing vibration of the user's microphone-speaker device 2 instead of outputting the notification sound. For example, the notification processor 115 causes vibration of the specific microphone-speaker device 2 when the predetermined condition is met. Furthermore, the notification processor 115 may vary the pattern of the vibration depending on the importance level. For example, the notification processor 115 causes the microphone-speaker device 2 to vibrate three times at short intervals when the condition for the "high" importance level is met, causes the microphone-speaker device 2 to vibrate twice at a long interval when the condition for the "medium" importance level is met, and causes the microphone-speaker device 2 to vibrate once when the condition for the "low" importance level is met. The notification processor 115 may alternatively cause the microphone-speaker device 2 to vibrate continuously until the predetermined condition is no longer met. The microphone-speaker device 2 may cause vibration of a vibrator disposed inside the microphone-speaker device 2 based on a signal received from the notification processor 115, or may cause vibration of a speaker unit while causing the speakers 25L and 25R to output a low pitch notification sound. The vibration is an example of the specific information according to the present disclosure.

As described above, the notification processor 115 may cause a specific microphone-speaker device 2 to output a predetermined notification sound or cause vibration of a specific microphone-speaker device 2 with a predetermined vibration pattern.

According to another embodiment, the notification processor 115 may cause the notification sound to be outputted to all of the participants in the conference depending on the predetermined condition. Specifically, the notification processor 115 causes all of the microphone-speaker devices 2 to output the notification sound when the remaining time until the ending time of the conference is less than or equal to a predetermined period of time. For example, the notification processor 115 causes the microphone-speaker devices 2A to 2H of the users A to H to output the notification sound when the remaining time until the end of the conference is five minutes, or when the ending time of the conference has come. Note that, when causing the notification sound to be outputted to all of the participants in the conference, the notification processor 115 may cause the microphone-speaker device 2A of the user A who serves as the facilitator to output a louder sound like a warning and cause the microphone-speaker devices 2B to 2H of the other participating users B to H to output a soft and gentle sound.

According to another embodiment, the conference server 3 may have the functions of the voice processing device 1. In this case, the conference server 3 acquires audio data from each of the microphone-speaker devices 2 and transmits the acquired audio data to other microphone-speaker devices 2. The conference server 3 also determines whether or not a predetermined condition is met with respect to a factor that affects the progress of the conference. When the predetermined condition is met, the conference server 3 causes a microphone-speaker device 2 selected from among the plurality of microphone-speaker devices 2 depending on the factor that affects the progress of the conference to provide specific information related to the predetermined condition.

The voice processing system according to the present disclosure may only include the voice processing device 1, may only include the conference server 3, or may include a combination of the voice processing device 1 and the conference server 3.

The voice processing system according to the present disclosure may have a configuration obtained by freely combining any of the embodiments described above within the scope of the disclosure set forth in the claims, or a configuration obtained by appropriately modifying any of the embodiments or omitting a portion of any of the embodiments within the scope of the disclosure set forth in the claims.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A voice processing system for enabling transmission and reception of audio data representing voice spoken by a plurality of users between a plurality of microphone-speaker devices that is wearable and that is worn, respectively, by the plurality of users, the voice processing system comprising:
  the plurality of microphone-speaker devices;
  a voice acquirer that acquires the audio data from each of the plurality of microphone-speaker devices;
  a voice transmitter that transmits the audio data acquired by the voice acquirer to other microphone-speaker devices;
  a determination processor that determines whether a predetermined condition is met with respect to a factor that affects a progress of a conference; and
  a notification processor that causes, when the predetermined condition is met, a microphone-speaker device, selected from the plurality of microphone-speaker devices based on the factor that affects the progress of the conference, to provide specific information related to the predetermined condition, wherein
  the specific information corresponds to an importance level of the predetermined condition,
  each of the plurality of microphone-speaker devices has a first speaker and a second speaker, and
  the notification processor causes both of the first and second speakers of the selected microphone-speaker device to provide the specific information when the importance level of the predetermined condition is a first importance level, and causes either the first speaker or the second speaker of the selected microphone-speaker device to provide the specific information when the importance level of the predetermined condition is a second importance level, which is lower than the first importance level.

2. The voice processing system according to claim 1, wherein
the determination processor further determines whether the predetermined condition is met with respect to at least one of the following:
progress of a conference in which the plurality of users is participating,
a communication state of the transmission and reception of the audio data, and
a speaking state of each of the plurality of users.

3. The voice processing system according to claim 2, wherein
the determination processor further determines whether a first predetermined period of time has elapsed since a start of the conference in which the plurality of users is participating or whether a remaining time until an end of the conference is less than or equal to a second predetermined period of time.

4. The voice processing system according to claim 2, wherein
the conference is an online conference in which the plurality of users is remotely participating, and
the determination processor further determines whether a communication quality of the audio data of each of the plurality of users is lower than or equal to a predetermined level in the online conference.

5. The voice processing system according to claim 1, wherein
the determination processor further determines whether a continuous input time of the spoken voice inputted to a microphone of each of the plurality of microphone-speaker devices is longer than or equal to a third predetermined period of time.

6. The voice processing system according to claim 2, further comprising a setting processor that sets, when the conference in which the plurality of users is participating is conducted, a microphone-speaker device of a first user who serves as a facilitator among the plurality of users, wherein
the notification processor further causes, when the predetermined condition is met, the microphone-speaker device of the first user to provide the specific information.

7. The voice processing system according to claim 5, wherein
the notification processor further causes a first microphone-speaker device to provide the specific information, the first microphone-speaker device being any of the plurality of microphone-speaker devices for which the continuous input time of the spoken voice inputted to the microphone thereof is longer than or equal to the third predetermined period of time.

8. The voice processing system according to claim 3, wherein
the notification processor further causes all of the plurality of microphone-speaker devices to provide the specific information when the remaining time until the end of the conference is less than or equal to the second predetermined period of time.

9. The voice processing system according to claim 1, wherein
the notification processor further causes the selected microphone-speaker device to output a specific notification sound as the specific information.

10. The voice processing system according to claim 9, wherein
the notification processor causes the selected microphone-speaker device to output the specific notification sound at a volume lower than a volume at which the selected microphone-speaker device outputs the spoken voice.

11. The voice processing system according to claim 1, wherein the notification processor further causes a vibration of the selected microphone-speaker device with a predetermined vibration pattern as the specific information.

12. The voice processing system according to claim 1, wherein each of the plurality of microphone-speaker devices has a neck-worn shape.

13. A voice processing method for enabling transmission and reception of audio data representing voice spoken by a plurality of users between a plurality of microphone-speaker devices that is wearable and that is worn, respectively, by the plurality of users, the voice processing method comprising:
acquiring the audio data from each of the plurality of microphone-speaker devices;
transmitting the acquired audio data to other microphone-speaker devices;
determining whether a predetermined condition is met with respect to a factor that affects a progress of a conference;
making a notification by causing, when the predetermined condition is met, a microphone-speaker device, selected from the plurality of microphone-speaker devices based on the factor that affects the progress of the conference, to provide specific information related to the predetermined condition, wherein the specific information corresponds to an importance level of the predetermined condition; and
causing both of a first speaker and a second speaker of the selected microphone-speaker device to provide the specific information when the importance level of the predetermined condition is a first importance level, and causing either the first speaker or the second speaker of the selected microphone-speaker device to provide the specific information when the importance level of the predetermined condition is a second importance level, which is lower than the first importance level, wherein
each of the plurality of microphone-speaker devices has the first and second speakers.

14. A voice processing system for enabling transmission and reception of audio data representing voice spoken by a plurality of users between a plurality of microphone-speaker devices that is wearable and that is worn, respectively, by the plurality of users, the voice processing system comprising:
the plurality of microphone-speaker devices;
a voice acquirer that acquires the audio data from each of the plurality of microphone-speaker devices;
a voice transmitter that transmits the audio data acquired by the voice acquirer to other microphone-speaker devices;
a determination processor that determines whether a predetermined condition is met with respect to a factor that affects a progress of a conference; and
a notification processor that causes, when the predetermined condition is met, a microphone-speaker device, selected from the plurality of microphone-speaker devices based on the factor that affects the progress of the conference, to provide specific information related to the predetermined condition, wherein
the notification processor causes the selected microphone-speaker device to output a specific notification sound as the specific information, and the specific notification sound is output at a volume lower than a volume at which the selected microphone-speaker device outputs the spoken voice.

* * * * *